LOGIC CIRCUIT EMPLOYING CAPACITOR SWITCHING ELEMENTS

Filed Oct. 3, 1962 2 Sheets-Sheet 1

INVENTOR:
JOHN F. CUBBAGE
BY: William B. Cahill
ATTORNEY:

LOGIC CIRCUIT EMPLOYING CAPACITOR SWITCHING ELEMENTS

Filed Oct. 3, 1962 2 Sheets-Sheet 2

United States Patent Office 3,183,485

Patented May 11, 1965

3,183,485
LOGIC CIRCUIT EMPLOYING CAPACITOR SWITCHING ELEMENTS

John F. Cubbage, Phoenix, Ariz., assignor to General Electric Company, a corporation of New York Filed Oct. 3, 1962, Ser. No. 228,106
3 Claims. (Cl. 340—147)

The present invention pertains to logical elements, and more specifically, to electronic elements for implementing logical functions in a data processing system.

Present day data processing systems are usually designed from basic "building blocks" which perform simple logical functions. Such logical functions as "AND" and "OR" provide the elementary means whereby more complex logical functions may be derived.

These logical elements or circuits may take the form of an electronic diode circuit or a transistor circuit adapted to receive a plurality of electrical signals and to provide an output signal when predetermined combinations of input signals are present. Since the speed of operation and physical size of these basic "building blocks" are critical factors in data processing equipment design, a compact, reliable, and fast operating logical element having low power requirements will enable the design of data processing components to ultimately provide cheaper, faster and reliable data processing systems.

Accordingly, it is an object of the present invention to provide an improved logical element for utilization in a data processing system.

It is a further object of the present invention to provide a logical element that may be utilized as an AND or an OR circuit.

It is a further object of the present invention to provide a logical element that may readily be expanded to provide complex logical functions.

Further objects and advantages of the present invention will become apparent to those skilled in the art as the description thereof proceeds.

Briefly stated, in accordance with one embodiment of the present invention, a logical element is provided by utilizing capacitive "pads" to transmit electrical pulses from one or a plurality of drive conductors to one or a plurality of sensing conductors. A sheet of insulating material is provided, on one side thereof, with a plurality of drive conductors each having portions thereof of substantially increased area. Sensing conductors are provided on the opposite side of the sheet of insulating material; similarly, the sensing conductors have portions thereof of substantially increased area disposed opposite the like areas of the drive conductors on the opposite side of the insulating sheet. The portions of increased area of these conductors thereby form capacitive "pads" which enable electrical coupling between the conductor on one side of the insulating sheet and the corresponding conductor on the opposite side of the insulating sheet.

Electrical pulse sources are connected to the drive conductors on one side of the insulating sheet, and a pulse detection circuit is connected to the sensing conductor on the opposite side of the insulating sheet. The various combinations of positive and/or negative pulses provided to the driving conductors by the electrical pulse sources yield an output signal detectable by the pulse detector indicative of the desired logical condition.

The invention, both as to its organization and operation, together with further objects and advantages thereof may best be understood by reference to the following description taken in connection with the accompanying drawings in which.

Figure 1:
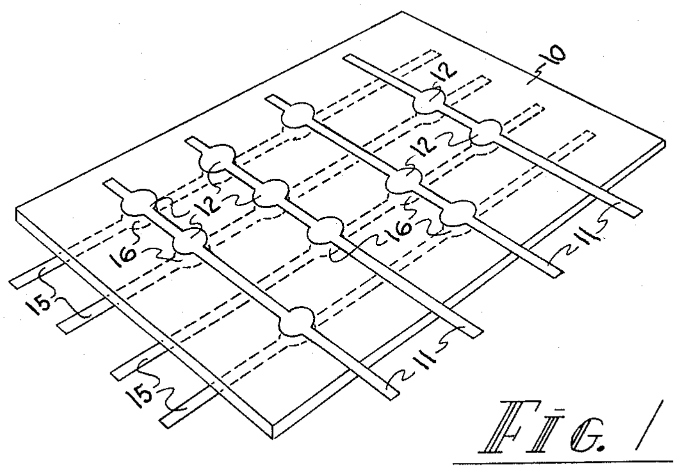
FIG. 1 is a perspective view of a logical element constructed in accordance with the teachings of the present invention.

Referring to FIG. 1, a sheet of insulating material 10 is provided with a plurality of drive conductors 11. These drive conductors are thin, narrow ribbons of conductive material lying flat on the upper surface of the insulating material 10. Each of the drive conductors 11 is provided with portions of increased area 12 which may be termed capacitive "pads." The pads 12 are of substantially greater area than the corresponding length of the drive conductor. The conductors 11 and pads 12 may be placed on the insulating sheet 10 by any conventional means such as, for example, electrodeposition, etching, plating, etc.

The sheet of insulating material 10 is also provided with a plurality of sensing conductors 15 placed on the opposite side from the drive conductors 11. The sensing conductors 15, in a manner similar to the drive conductors 11, have capacitive pads 16 positioned opposite corresponding capacitive pads 12 of the drive conductors 11. The capacitive pads on the top and bottom of the sheet of insulating material 10 form pairs which may be considered equivalent to the plates of capacitors. Thus, an electrical pulse applied to one of the drive conductors 11 will be capacitively coupled to the sensing conductors 15 having pads 16 positioned opposite corresponding pads 12 of the drive conductor. Since the area of the pads is substantially greater than the area of the corresponding length of the individual conductors, the capacity existing between conductors on one side of the sheet 10 and the other side of the sheet 10 is insignificant in comparison to the capacity between pads of a pair. To insure that the signal existing on any of the sensing conductors 15, by virtue of an electrical pulse applied to one of the drive conductors 11, is a signal derived through the capacitive coupling of a pad pair and not merely by the capacitance existing between conductors, a detector (not shown in FIG. 1) may be provided at the output of each sensing conductor that will inhibit the transmission of any electrical signal below a predetermined threshold value.

Figures 2, 3:
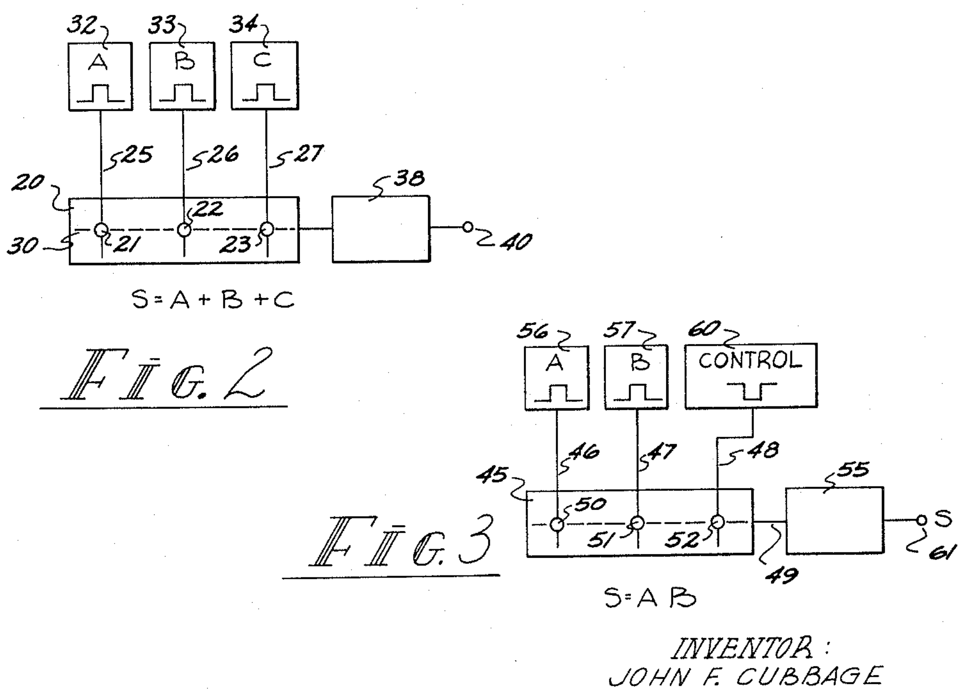
FIG. 2 is a schematic drawing of a logical OR-gate illustrating the teachings of the present invention.
FIG. 3 is a schematic drawing of a logical AND-gate illustrating the teachings of the present invention.

Referring to FIG. 2, a schematic drawing of a logical OR-gate is shown. A sheet of insulating material 20 is provided with three capacitive pad pairs 21, 22 and 23. Three drive conductors 25, 26 and 27 are positioned on one side of the insulating sheet 20, and a single sensing conductor 30 is arranged on the opposite side of the insulating sheet 20. Electrical pulse sources 32, 33 and 34 are connected to the drive conductors 25, 26, and 27, respectively. Each of the electrical pulse sources 32–34 provides logical pulses for the subsequent development of a logical signal. For convenience, we may arbitrarily assume that a positive-going pulse represents a binary "1". The pulse sources 32–34 are each shown as means for providing positive-going pulses or binary "1's" to the corresponding pad. Also for convenience, each of the corresponding pulses is labeled by an A, B, or C. Similarly, the sensing conductor 30 is connected to a pulse detector 38 which may be a threshold detection device useful for detecting the existence of a signal above a predetermined threshold level and a given polarity; in the embodiment chosen for illustration the polarity is positive. The output of the pulse detector 38 is connected to an output terminal 40. The signal existing at terminal 40 may conveniently be labeled S. The OR circuit of FIG. 2 provides the logical disjunctive of the three input signals A, B, and C provided by the electrical pulse sources 32–34. Thus, the Boolean notation for the output signal S present at the output terminal 40 in terms of the input signals provided to each of the drive conductors (signals A, B, and C) is as follows:

$$S=A+B+C$$

The implementation of this logical function will be evident from the description of operation. To provide the disjunctive, the signal at the output terminal 40 must be a positive-going pulse whenever any of the input signals A, B, and C are a positive-going pulse. Thus, if the input signal A is a positive-going pulse, which thereby would be communicated to the drive conductor 25, the pulse would be capacitively coupled through the capacitive pad pair 21 to the sense conductor 30. The pulse detector 38, upon sensing the pulse existing on the sense conductor 30, would provide a similar positive-going pulse to the terminal 40. Similar action would take place if either signal B or signal C were a positive-going pulse which would be coupled to the sense conductor 30 through either the capacitive pad pair 22 or capacitive pad pair 23, respectively. Accordingly, it may be seen that the logical element of FIG. 2, utilizing the capacitive logic of FIG. 1, implements the logical disjunctive of the logical signals A, B, and C.

Referring to FIG. 3, a schematic drawing of a logical AND-gate is illustrated utilizing the capacitive logic of the present invention. A sheet of insulating material 45 is provided in a manner similar to that described in FIG. 2 with three drive conductors 46, 47, and 48 on one side thereof, and a sensing conductor 49 on the other side thereof. Capacitive pad pairs 50–52 are provided for the drive conductors to capacitively couple signals existing thereon to the sensing conductor 49. A pulse detector 55 is connected to the sensing conductor 49 to provide the appropriate threshold detection for the logical gate. Electrical pulse sources 56 and 57 are connected to drive conductors 46 and 47, respectively. The electrical pulse sources 56 and 57 provide logic pulses A and B which, as described previously, represent binary "1's" when a positive-going pulse is presented. A third electrical pulse source 60 provides a negative-going electrical pulse which may be called a control pulse. The control pulse is of the same amplitude and of at least as great duration, but opposite polarity to the logic pulses A or B. The simultaneous existence of one of the pulses A or B and the control pulse from electrical pulse source 60 will result in a net pulse amplitude of zero since the negative-going and positive-going pulses will cancel each other. However, if the logic pulses A and B should each occur simultaneously with the control pulse, the net effect of the three pulses capacitively coupled to the sensing conductor 49 will be a single positive-going electrical pulse indicative of a binary "1." Therefore, the electrical signal S existing at the output terminal 61 of the logical gate must represent the logical conjunctive of the logic pulses A and B. The Boolean notation of the logic implemented by the logical element of FIG. 2 may be stated:

$$S=AB$$

The operation of the AND-gate of FIG. 3 may be described as follows. A negative-going control pulse is applied to the drive conductor 48 each time a logical determination is to be made. Consequently, if either a positive-going pulse A or B is presented to drive conductor 46 or 47, respectively, the net effect of the positive-going logic pulse and negative-going control pulse will be a pulse of zero amplitude thereby failing to present any signal at the output terminal 61. If logic pulses A and B simultaneously couple to the sensing conductor 49 through the associated capacitive pads, the effect of a negative-going control pulse will be overcome and a positive-going output pulse will appear at the output terminal 61. The logical conditions for conjunction are thus provided and the output signal S may be represented as the logical conjunctive of input signals A and B.

Figure 4:
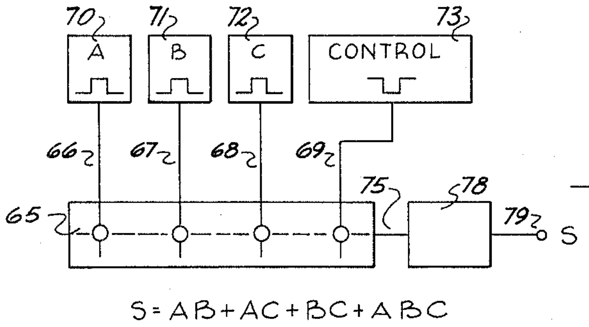
FIG. 4 is a schematic drawing of a capacitive logical element constructed in accordance with the teachings of the present invention for the development of a complex logic signal.

Referring to FIG. 4, the implementation of the present invention is illustrated for the development of a complex logic signal. The sheet of insulating material 65 is provided with four drive conductors 66–69 for the receipt of logic signals A, B, and C and a control signal, respectively. The logic signals A, B, and C are provided by logic pulse sources 70–72, respectively. The negative-going control signal is provided by electrical pulse source 73. Each of the electrical pulses provided by the logic pulse sources 70–72 and control pulse source 73 is capacitively coupled through the corresponding capacitive pad pair to the sensing conductor 75. A pulse detector 78 is connected to the sensing conductor 75 and provides an output signal S to the output terminal 79. The operation of the logical element of FIG. 4 is similar to the logical elements of FIGURES 2 and 3. If a positive-going logic signal A, B, and C is provided to the corresponding drive line, the pulse will be capacitively coupled to the sensing conductor 75. However, if the negative-going control pulse from control pulse source 73 is also coupled to the sensing conductor 75, one of the positive-going logic pulses from either source 70, 71 or 72 will be nullified. Accordingly, the Boolean notation for the logical signal S provided by the logical element of FIG. 4 may be presented as follows:

$$S=AB+AC+BC+ABC$$

Figure 5:
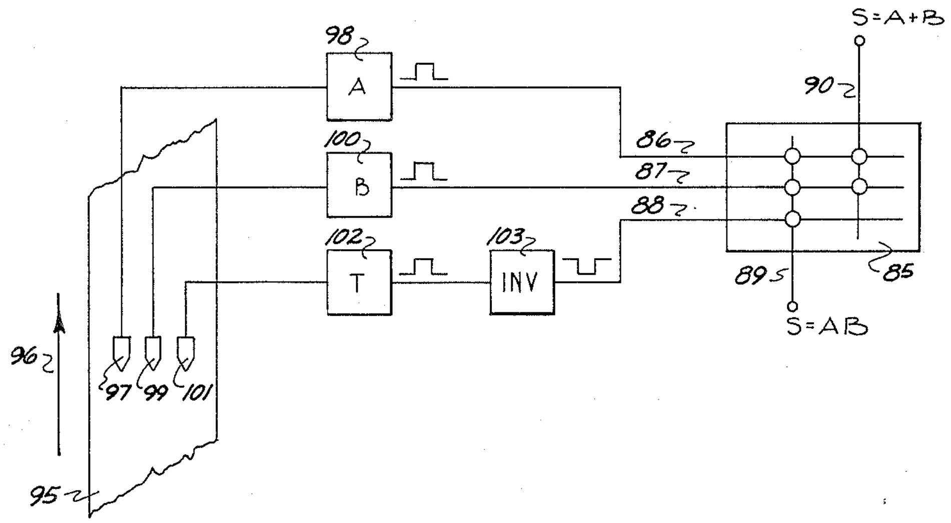
FIG. 5 is a schematic drawing of a capacitive logical element constructed in accordance with the teachings of the present invention for the development of a plurality of logic signals from a recording medium.

Referring to FIG. 5, a schematic drawing of a capacitive logical element, constructed in accordance with the teachings of the present invention, for deriving a plurality of logical signals from a recording medium is shown. In the embodiment shown in FIG. 5, a sheet of insulating material 85 is provided with drive conductors 86, 87, and 88, and is provided with sensing conductors 89 and 90. Capacitive pads are provided between the corresponding conductors to provide for coupling of pulses existing on the corresponding drive conductors to the sensing conductors. However, it will be noted that a capacitive pad is omitted, and no capacitive coupling exists, between the sensing conductor 90 and drive conductor 88. The effect of the omission of this capacitive pad pair illustrates the flexibility of the concept of the present invention to implement a plurality of logical conditions and simultaneously derive signals indicative of a plurality of logical states. A magnetic tape, shown schematically at 95, is moved in the direction shown by arrow 96. The magnetic tape 95 may contain a plurality of channels. In the instant example, only three channels are shown. The first channel is detected by a transducer 97 which transmits the corresponding electrical signal to a pulse network 98 for the development of a positive-going pulse A. Similarly, a second transducer 99 detects the presence of binary "1's" and provides corresponding electrical signals to a pulse network 100 for the development of positive-going logical pulses B. A third transducer 101 detects the presence of timing bits in the third channel of the magnetic tape and provides electrical signals indicative of these timing bits to a third pulse network 102. The pulses T provided by the pulse network 102 are positive-going pulses representing the timing bits on the magnetic tape. These pulses T may be inverted to provide negative-going pulses through the expediency of any of several well known inverter circuits 103.

The operation of the logical element of FIG. 5 will now be described. As the magnetic tape 95 is moved beneath the transducers 97, 99, and 101, the timing pulses are detected by the transducer 101 and applied to the pulse circuit 102. After the appropriate timing pulse T is developed, and inverted in an inverter 103, the resulting negative-going pulse is applied to the drive conductor 88. When a binary "1" bit is detected by either transducer 97 or 99, a corresponding positive-going pulse will be provided by pulse network 98 or 100, respectively. Thus, a positive-going pulse from either pulse network 98 or 100 will be applied to the drive conductors 86 or 87. If binary "1's" are detected by both transducers 97 and 99, positive-going pulses will be developed by both pulse networks 98 and 100, and these pulses will be applied to drive conductors 86 and 87 and subsequently capacitively coupled to the sense conductor 89. The negative-going timing pulse from the inverter 103, applied to the drive conductor 88, will nullify the effect of one of the positive-going pulses on either of the drive conductors 86 and 87, yielding the net effect of a single positive-going pulse. Therefore, the output signal S provided by the sensing conductor 89 may be considered the logical conjunctive of signals A and B. Whereas, since the negative going timing pulse from the inverter 103 is not capacitively coupled to the sensing line 90, a positive-going pulse from either of the drive conductors 86 or 87 will sufficiently capacitively couple a signal to the sensing conductor 90 to provide a signal S which will be a positive-going pulse when either the signals A and B are positive-going. Therefore, the signal S provided by the sensing conductor 90 represents the logical disjunctive of the signals A and B.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to secure by Letters Patent of the United States is:

1. A logical AND-gate comprising, a sheet of insulating material, a plurality of pairs of capacitive pads, the individual pads of each pair of pads arranged on opposite sides of said sheet of insulating material and positioned opposite each other, a sensing conductor electrically connecting all of the pads on one side of said sheet, a plurality of drive conductors each connected to a different one of said pads on the other side of said sheet, a plurality of logic pulse sources and a plurality of control pulse sources each connected to a different one of said drive conductors, the plurality of control pulse sources being one less than the plurality of logic pulse sources, said control pulse sources providing a pulse of opposite polarity to and equal in amplitude to pulses provided by said logic pulse sources.

2. A logical AND-gate comprising, a sheet of insulating material, a plurality of pairs of capacitive pads, the individual pads of each pair of pads arranged on opposite sides of said sheet of insulating material and positioned opposite each other, a sensing conductor electrically connecting all of the pads on one side of said sheet, a plurality of drive conductors each connected to a different one of said pads on the other side of said sheet, a plurality of logic pulse sources and a plurality of control pulse sources each connected to a different one of said drive conductors, the plurality of control pulse sources being one less than the plurality of logic pulse sources, said control pulse sources providing a pulse of opposite polarity to and equal in amplitude to pulses provided by said logic pulse sources, a pulse detector responsive to electrical pulses of a predetermined polarity and of a minimum amplitude for providing an electrical signal indicative of the existence of the logical conjunctive of pulses from said logic pulse sources, and means connecting said pulse detector to said sensing conductor.

3. A logical AND-gate comprising, a sheet of insulating material, a plurality of pairs of capacitive pads, the individual pads of each pair of pads arranged on opposite sides of said sheet of insulating material and positioned opposite each other, a sensing conductor electrically connecting the pads on one side of said sheet, a plurality of drive conductors each connected to a different one of said pads on the other side of said sheet, a plurality of logic pulse sources for providing logic pulses of a given polarity, at least one control pulse source for providing a pulse of a polarity opposite to that of said logic pulses, each of said logic and control pulse sources connected to a different one of said drive conductors, a pulse detector responsive to pulses of a predetermined polarity and minimum magnitude for providing a signal indicative of the existence of the logical conjunctive of pulses from more than one of said logic pulse sources, and means connecting said pulse detector to said sensing conductors.

References Cited by the Examiner

UNITED STATES PATENTS

| | | | |
|---|---|---|---|
| 3,077,591 | 2/63 | Akmenkalns | 340—173 X |
| 3,098,997 | 7/63 | Means | 340—173 |
| 3,118,133 | 1/64 | Meeker et al. | 340—173.2 |

NEIL C. READ, *Primary Examiner*.